United States Patent
Ruotsalainen

(10) Patent No.: US 9,507,978 B2
(45) Date of Patent: Nov. 29, 2016

(54) ANTENNA DEVICE FOR RFID READER/WRITER

(71) Applicant: NORDIC ID OY, Salo (FI)

(72) Inventor: Sami Ruotsalainen, Turku (FI)

(73) Assignee: NORDIC ID OY, Salo (FI)

( * ) Notice: Subject to any disclaimer, the term of this patent is extended or adjusted under 35 U.S.C. 154(b) by 0 days.

(21) Appl. No.: 14/433,947

(22) PCT Filed: Oct. 2, 2013

(86) PCT No.: PCT/FI2013/050952
§ 371 (c)(1),
(2) Date: Apr. 7, 2015

(87) PCT Pub. No.: WO2014/057167
PCT Pub. Date: Apr. 17, 2014

(65) Prior Publication Data
US 2015/0261983 A1 Sep. 17, 2015

(30) Foreign Application Priority Data
Oct. 8, 2012 (FI) .................................... 20126048

(51) Int. Cl.
G06K 19/00 (2006.01)
G06K 7/10 (2006.01)
H04B 7/10 (2006.01)
(Continued)

(52) U.S. Cl.
CPC ....... G06K 7/10178 (2013.01); G06K 7/10356 (2013.01); H01Q 1/2216 (2013.01); H01Q 3/02 (2013.01); H04B 5/0062 (2013.01); H04B 7/10 (2013.01); H01Q 9/16 (2013.01); H01Q 21/24 (2013.01)

(58) Field of Classification Search
USPC .......... 235/435, 439, 454, 487, 492; 340/10, 340/572
See application file for complete search history.

(56) References Cited

U.S. PATENT DOCUMENTS 3,213,456 A    10/1965  Korvin
6,278,409 B1 *  8/2001  Zuta ...................... G01S 7/025
                                              342/188
(Continued)

FOREIGN PATENT DOCUMENTS

EP    1 035 664 A1    9/2000
JP    2002-064328     2/2002
(Continued)

OTHER PUBLICATIONS

Jarrett D. Morrow "Polarization-Adjustable Omnidirectional Dipole Array", IEEE Antennas and Wireless Propagation Letters, vol. 2, 2003, p. 223-225.
(Continued)

Primary Examiner — Matthew Mikels
(74) Attorney, Agent, or Firm — Young & Thompson

(57) ABSTRACT

An antenna device that includes a pair of antenna elements for an RFID reader/writer to communicate information with an RFID tag is provided. The antenna elements are movably connected to each other so that one of the antenna elements is configured to intensify the other of the antenna elements to radiate radio wave. The antenna device has at least operation modes, where the antenna elements are in parallel to each other and where the antenna elements are orthogonal to each other. The RFID reader/writer device includes such a pair of antenna elements.

18 Claims, 2 Drawing Sheets

(51) Int. Cl.
*H04B 5/00* (2006.01)
*H01Q 1/22* (2006.01)
*H01Q 3/02* (2006.01)
*H01Q 21/24* (2006.01)
*H01Q 9/16* (2006.01)

(56) References Cited

U.S. PATENT DOCUMENTS

| | | | |
|---|---|---|---|
| 6,906,674 B2 | 6/2005 | McKinzie, III et al. | |
| 8,912,968 B2 * | 12/2014 | Sharma | H01Q 9/0421 343/700 MS |
| 9,000,894 B2 * | 4/2015 | Chan | G06K 7/0008 340/10.3 |
| 2007/0152831 A1 | 7/2007 | Eisele | |
| 2007/0222608 A1 | 9/2007 | Maniwa | |
| 2012/0157006 A1 * | 6/2012 | Hong | H01Q 1/2225 455/67.14 |

FOREIGN PATENT DOCUMENTS

| | | |
|---|---|---|
| JP | 2007006239 A | 1/2007 |
| JP | 2007174470 A | 7/2007 |
| JP | 2009044647 A | 2/2009 |
| JP | 2009273011 A | 11/2009 |
| WO | 97/47055 A1 | 12/1997 |

OTHER PUBLICATIONS

Fan Yang et al.: "A Low Profile Single Dipole Antenna Radiating Circularly Polarized Waves" IEEE Transactions on Antennas and Propagation, vol. 53, No. 9, Sep. 2005, Manuscript: revised Dec. 1, 2004, p. 3083-3086.

S. Gao et al.: "Polarization-Agile Antennas", 1. School of Informatics, Engineering and Technology, Northumbria University Newcastle Upon Tyne, NE1 8ST, UK, 2. School of Communication Engineering, Shanghai University Shanghai, P. R. China 200072, IEEE Antennas and Propagation Magazine, vol. 48, No. 3, Jun. 2006.

International Search Report, dated Dec. 27, 2013, from corresponding PCT application.

FI Search Report, dated May 28, 2013, from corresponding FI application.

United Kingdom Search Report dated Mar. 21, 2016; Application No. 1505323.4.

* cited by examiner

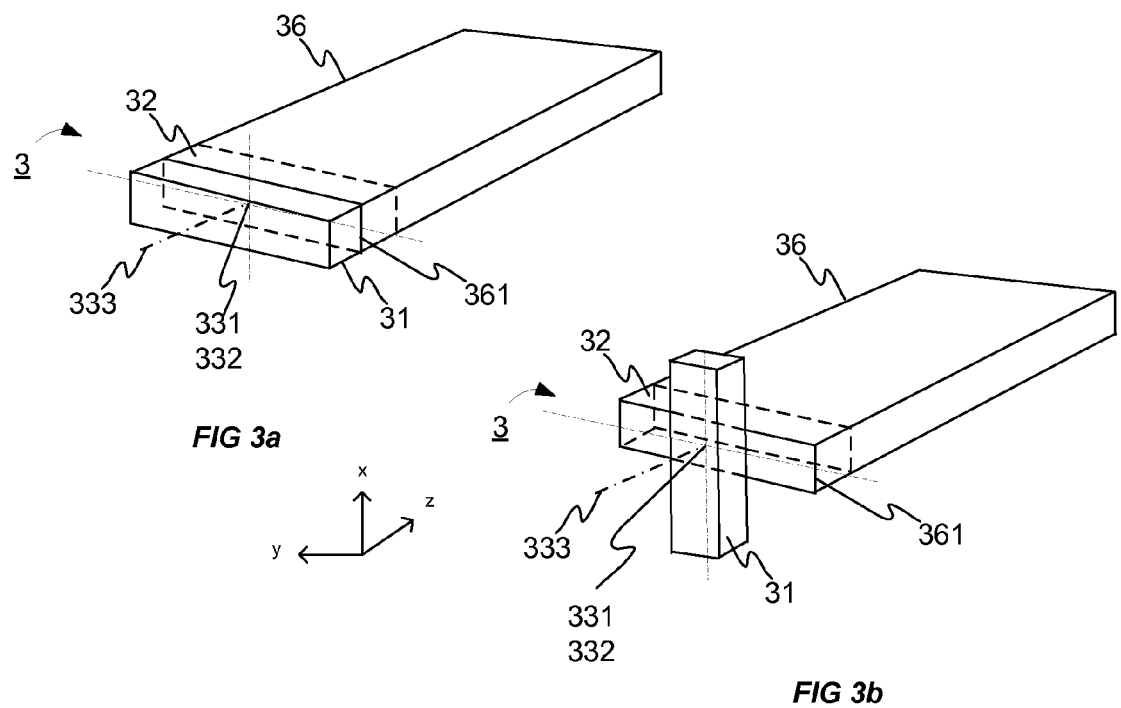
FIG 3a
FIG 3b
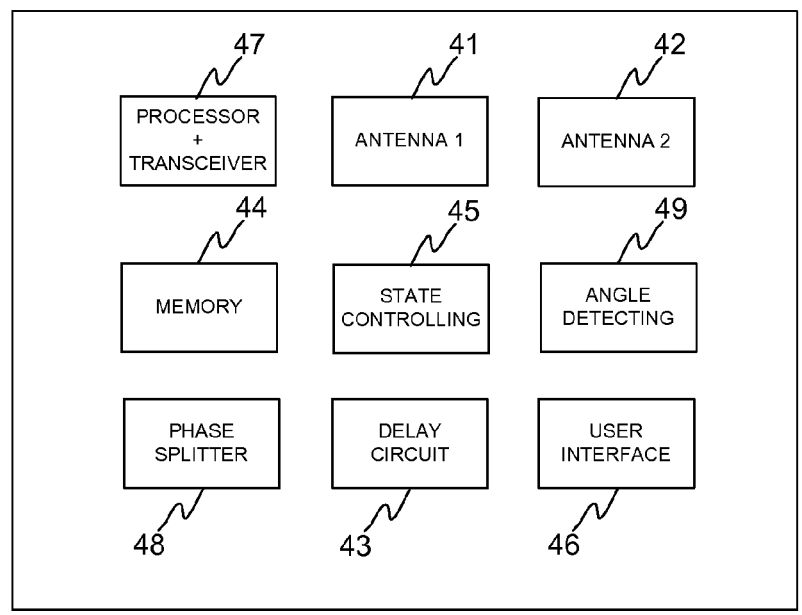
FIG 4

ANTENNA DEVICE FOR RFID READER/WRITER

TECHNICAL FIELD

The invention relates to RFID (Radio Frequency Identification) reading or writing devices and more particular an antenna device that improves operation of the RFID reading or writing device.

BACKGROUND

In an RFID system a reader/writer needs a transmitting antenna to convert a voltage created by the reader/writer to an electromagnetic wave that is transmitted as a radio signal to a tag being attached to an object. The reader/writer also needs a receiving antenna to detect a radio signal received from the tag. These two antennas are realized by a pair of antennas being physically separated in close proximity to each other or a single antenna that is used for both transmitting and receiving signals.

However, using the same antenna in different circumstances does not provide the best read rates or the required read zone. Any reflection, diffraction or absorption changes the read zone and anything that propagates a wave can cause signal strength degradation.

If the read zone doesn't cover all the locations in which the user would like to read the tags multiple antennas or multiple pairs of antennas connected to the reader/writer can be used. These antennas or pairs of antennas are not used simultaneously, but are accessed in time sequence to search the read zones available to this particular reader/writer.

However, to configure the reader/writer having multiple antennas or pairs of antennas there is a need to specify which antenna or sequence of antennas should be used and when.

Typically, the reader/writer employs a dipole transmit antenna which is linear in polarization. The RFID tag is usually provided with a linearly polarized antenna such as wire-like metal lines in one direction, a loop or dipole. Exact orientation of the tag antenna is not easy to control. This is problematic especially if the linearly polarized antenna of the reader/writer is orthogonal to the linearly polarized antenna of the tag because there is no electric field along the direction of the propagation axis. This means that no voltage will transfer from the reader/writer to power the microchips of the tag and that communication between the two will be impossible.

Since the orientation of the tag relative to the reader/writer is not easily controlled, omnidirectional antennas being circular in polarization can be used on the tags. Then at least some of the power from the reader/writer with the linearly polarized antenna is usable to power the tag.

However, the use of omnidirectional antennas in tags is critical because their size. There is a need to minimize the size of tags so that they can be attached even to small items. To make the tag small in size means that the size of the antenna has to be reduced. Therefore, the use of small linearly polarized antennas such as loops or dipoles are preferred in tags.

SUMMARY OF THE INVENTION

The object of the invention is to improve communicative connection between an RFID reader/writer with a linearly polarized antenna and an RFID tag with a linearly or circularly polarized antenna. In other words, communicative connection with the RFID reader/writer is provided independent of the type of the polarized radiation of the tag antenna so that any type of tag antennas starting from simple antenna structures can be used.

The object of the invention is achieved by providing for an RFID reader/writer a pair of antenna elements that are movably connected to each other so that in a first mode the antenna elements are in parallel to each other and in a second mode the antenna elements are orthogonal to each other. Any intermediate angle is also possible.

In accordance with a first aspect of the invention there is provided an antenna device that comprises a pair of antenna elements for an RFID reader/writer to communicate information from/to an RFID tag. Said pair of antenna elements are movably connected to each other so that one of the antenna elements is configured to intensify the other of the antenna elements to radiate radio wave, wherein in a first mode the antenna elements are in parallel to each other, and in a second mode the antenna elements are orthogonal to each other.

In accordance with a second aspect of the invention there is provided an RFID reader/writer that comprises the antenna device according to any of preceding claims and a frame, wherein one of the antenna elements is permanently fixed to a side of the frame so that in the first mode the antenna elements in their entirety are placed along the side of the frame.

Embodiments of the invention are presented in dependent claims.

According to an embodiment of the present invention the first antenna element is arranged in parallel with the second antenna element and the first antenna element acts as a radiating element of the antenna device.

In an example, the second antenna element can act as a reflecting element so that it enhances directivity of radiation of the radiating element. Preferably, directivity of radiation is enhanced towards the reading/writing direction of the RFID tag, i.e. in the direction of propagation of the radio wave towards the RFID tag. Alternatively, the second antenna element is switched to a state in which it does not interfere to operation of the radiating element. Alternatively, the first antenna element and the second antenna element are switched together to act as a single radiating element.

Preferably, at least the first antenna element that is used as the radiating element is configured to radiate a linear polarized radio wave.

According to another embodiment of the present invention the first antenna element is arranged to be orthogonal with the second antenna element and the first antenna element acts as a first radiating element of the antenna device.

In an example, the second antenna element can act as a second radiating element of the antenna device.

Preferably, the first antenna element that is used as the first radiating element is configured to radiate a vertically linear polarized radio wave and the second antenna element that is used as the second radiating element is configured to radiate a horizontally linear polarized radio wave. The first and second radiating elements enable independent action where the action of the first and second radiating elements alternate one after the other or where the action of the first and second radiating elements are switched on and off one at a time independent of each other. Alternatively, as a combined action, the first and second radiating elements enable a cross polarized radio wave towards the reading/writing direction of the RFID tag.

Preferably, the antenna device comprises a pair of dipole antenna elements being applied to an RFID system for communicating information between a reader/writer and a tag using a radio signal. The dipole antenna elements are movably connected to each other preferably at a connection point in which centers of longitudinal axes of the dipole antennas meet each other.

A benefit of the embodied invention is to provide more effective reading and/or writing of the RFID tag independent of the orientation of the tag. This is achieved by the antenna device being able to radiate both linear polarized radio wave and circular polarized radio wave depending on the position of the antenna elements in relation to each other. This means that one would not need to necessarily know the orientation of the RFID tag relative to the RFID reader/writer device because one can try both types of radiation.

It is also beneficial to use smallest possible antenna structures in RFID tags. Even simple antenna structures radiating a linear polarized radio wave can be used without overlooking any of the tags or missing reading/writing information from/to any of the tags. Co-operation of the antenna elements in the reader/writer provide thus reliable reading/writing of tags in the RFID system.

A further benefit of the embodied invention is that the size of the portable reader/writer device maintains reasonable. The dimensions of the antenna device do not extend beyond the dimensions of the reader/writer device when the device is not in use or when transporting it from one place to another.

BRIEF DESCRIPTION OF THE DRAWINGS

Various embodiments of the invention together with additional objects and advantages will be best understood from the following description of specific embodiments when read in connection with the accompanying drawings.

FIGS. 3a and 3b depict examples of an RFID reader/writer in which aspects of the disclosed embodiments may be applied.

FIG. 4 depicts a block diagram of an RFID reader/writer according to an embodiment of the invention.

DETAILED DESCRIPTION OF THE INVENTION

When an electromagnetic wave is radiated electrons move in the plane perpendicular to the direction of propagation of the wave. The direction in which the electric field points, determines the polarization of the radiated wave. When this direction is constant in time, the wave is linearly polarized. Linearly polarized antennas are typically oriented either vertically or horizontally. Also any intermediate angle is possible because the electric field can point in any direction in the plane perpendicular to the direction of propagation.

However, the direction in which the electric field points, i.e. the direction of polarization, is often time dependent. When the electric field rotates around the axis of propagation as a function of time, without changing its magnitude, circularly polarized wave is produced. Depending on the sense of rotation circular polarization is said to be either right-handed or left-handed. Circular polarized radiation can be regarded as the sum of vertical and horizontal polarized waves that are out of phase by 90 degrees.

Figure 1:
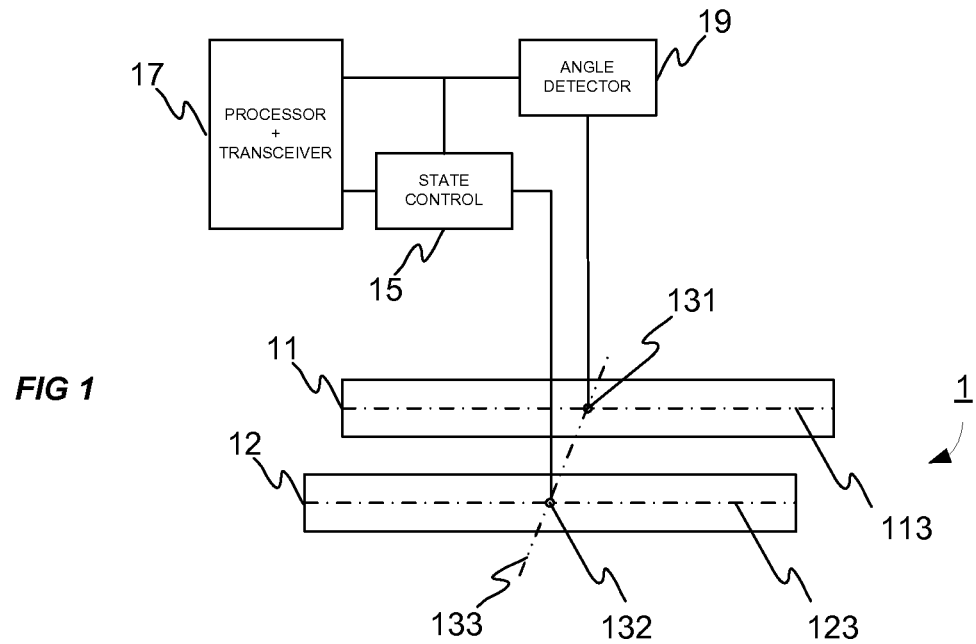
FIG. 1 depicts a block diagram of an antenna device according to an embodiment of the invention.

FIG. 1 depicts a block diagram of an antenna device 1 according to an embodiment for an RFID reader/writer being able to communicate information with an RFID tag. The antenna structure 1 comprises a pair of antenna elements 11, 12 so that one of the antenna elements is rotatable 90 degrees relative to other of the antenna elements. The two antenna elements 11, 12 are movably connected to each other for the reason that one of the antenna elements is able to intensify the performance of the other of the antenna elements so that the antenna elements 11, 12 together as a combination would radiate radio wave towards the RFID tag antenna (not shown) most efficiently. At least one or both of the antenna elements 11, 12 are able to radiate a linear polarized radio wave. Preferably, the antenna elements 11, 12 are dipole antenna elements which are linear in polarization.

In an antenna device 1 according to an example, the two antenna elements 11, 12 are movably connected to each other at a connection point in which centers 131, 132 of the antenna elements 11, 12 are located. Points where the center axes of length 113, 123 and the center axes of width (not shown) of the antenna elements 11, 12 intersect, are the centers 131, 132 of the antenna elements 11, 12. The antenna elements 11, 12 are mechanically connected to each other at the connection point using fastening means so that one of the antenna elements 11, 12 is rotatable 90 degrees relative to other of the antenna elements 11, 12 around a rotation axis 133. The rotation axis 133 goes through the center points 131, 132 of the antenna elements 11, 12. At the connection point the fastening means such as a hinge, joint, pivot or other suitable fastening means, movably connects the center points 131, 132 to each other. The fastening means are configured to enable the antenna elements 11, 12 to operate either as separate electronic elements or as combined electronic elements. In other words, the center points 131, 132 are electrically isolated from each other but can be connected to each other through a switching device (not shown) according to instructions received from state controlling means 15 in the RFID reader/writer. The antenna elements 11, 12 have feed points preferably at the center points 131, 132 to receive signal voltage from the signal source (not shown). In case the dipole antenna elements, each dipole antenna is constructed of two pieces of collinear wire where opposed voltages are driven through the feed points.

In an antenna device 1 according to an example, position detecting means 19 is configured to detect a position of the antenna elements 11, 12 with respect to each other. The detected position information includes information about an angle between the antenna elements 11, 12. For example, the angle is 0 degrees when the antenna elements 11, 12 are in parallel and 90 degrees when the antenna elements 11, 12 are orthogonal with respect to each other. Any intermediate angle between 0 and 90 degrees is also possible. In an example, the position detecting means comprises a magnet and a Hall element to detect positions in a known way. In another example, the position detecting means comprises a 3D acceleration sensor and/or force transducer. Or the position detecting means comprises a 3D acceleration sensor or force transducer in addition to a magnet and a Hall element. The position detecting means 19 is also configured to transmit position information further. This information can be used to automatically control the operation of the antenna device 1 when the angle changes. For example, the position detecting means 19 transmits the position information to the state controlling means 15 in the RFID reader/writer to control operation states of the antenna device 1 in co-operation with a processor 17 in the RFID reader/writer. The position information can be used elsewhere in the RFID system, too. The antenna device 1 comprises a radio frequency transceiver being arranged to transmit and receive information to/from the antenna elements (11, 12) in co-operation with a processor 17. The transceiver and the processor 17 may be separate chips or integrated into the same chip.

In an antenna device 1 according to an example, the antenna elements 11, 12 are in parallel to each other. According to instructions received from the state controlling means 15 one of the antenna elements 11, 12 is configured to act as a radiating element. It radiates a linear polarized radio wave. According to instructions received from the state controlling means 15 the other of the antenna elements 11, 12 is configured to act as a reflecting element. The reflecting element and the radiating element are connected to perform the combined act in which the reflecting element enhances directivity of radiation of the radiating element. In this way the directivity of the antenna device 1 is made more effective so that communication with RFID tags is improved.

In an antenna device 1 according to another example, the antenna elements 11, 12 are in parallel to each other. According to instructions received from the state controlling means 15 one of the antenna elements 11, 12 is configured to act as a radiating element. It radiates a linear polarized radio wave. According to instructions received from the state controlling means 15 the other of the antenna elements 11, 12 is switched to a state in which it does not interfere to operation of the radiating element. Actually, in this state the antenna elements 11, 12 are connected to perform the combined act in which a single antenna element is radiating a linear polarized wave. In this way the directivity of the antenna device 1 is made more effective in a certain read zone to communicate information with RFID tags.

In an antenna device 1 according to still another example, the antenna elements 11, 12 are in parallel to each other. According to instructions received from the state controlling means 15 one of the antenna elements 11, 12 is configured to act as a radiating element. According to instructions received from the state controlling means 15 the other of the antenna elements 11, 12 is configured to act as a radiating element in combination with the other radiating element. The two radiating elements are connected to perform the combined act in which they form the united radiating element. This united radiating element radiates a linear polarized radio wave. In this way the antenna device 1 is made more effective so that communication with RFID tags is improved.

Figure 2:
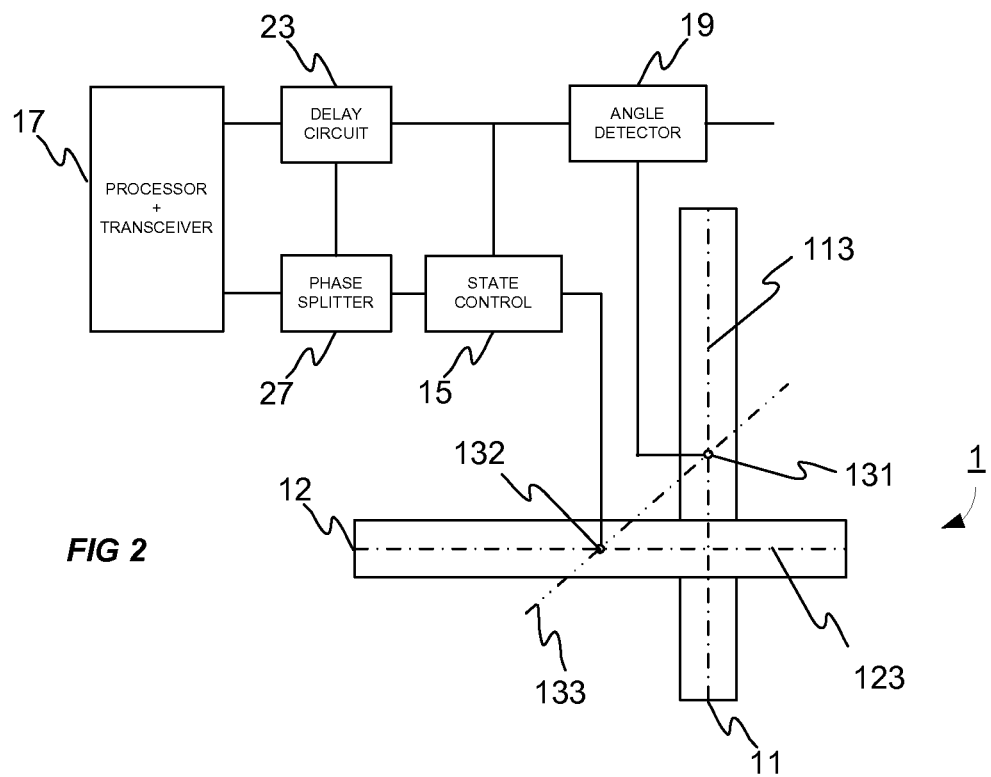
FIG. 2 depicts a block diagram of an antenna device according to another embodiment of the invention.

FIG. 2 depicts a block diagram of an antenna device 1 according to an embodiment for an RFID reader/writer being able to communicate information with an RFID tag. The antenna structure 1 comprises a pair of antenna elements 11, 12 so that one of the antenna elements 11, 12 is orthogonal in relation to other of the antenna elements 11, 12. One of the antenna elements 11, 12 is able to radiate a horizontally linear polarized radio wave. The other of the antenna elements 11, 12 is able to radiate a vertically linear polarized radio wave. Preferably, the antenna elements 11, 12 are dipole antenna elements which are horizontally and vertically linear in polarization. The two antenna elements 11, 12 are movably connected to each other for the reason that one of the antenna elements is able to intensify the performance of the other of the antenna elements so that the antenna elements 11, 12 together as a combination would radiate radio wave towards the RFID tag antenna (not shown) most efficiently.

In an antenna device 1 according to an example, the antenna elements 11, 12 are orthogonal to each other. According to instructions received from the state controlling means 15 one of the antenna elements 11, 12 is configured to act as a first radiating element. It radiates a horizontally linear polarized radio wave. According to instructions received from the state controlling means 15 the other of the antenna elements 11, 12 is configured to act as a second radiating element that radiates a vertically linear polarized radio wave. The first and second radiating elements are connected to perform the combined act in which the radiating elements produce a cross polarized radiation. The both antenna elements 11, 12 act as a single radiating element. In this way the antenna device 1 is made more effective because communication with RFID tags is possible independent of the tag orientation. By transmitting cross polarized radio wave the RFID reader/writer is able to transmit and receive information from the tags having simple linear polarized antennas, cross polarized dipole antennas or other linear or circular polarized antennas.

In the cross or circular polarized antenna the polarized electromagnetic wave is comprised of the horizontally and vertically linear polarized electric field components that are orthogonal, have equal amplitude and are 90 degrees out of phase. For example, the antenna device comprising two dipole antenna elements that are oriented at 90 degrees and one of the two dipole antenna elements is fed 90 degrees out of phase with the other of the two dipole antenna elements, is said to be the simplest type of circular polarized antenna (also called crossed dipole antenna). The crossed dipole antenna offers an omnidirectional radiation pattern so that horizontal polarization and vertical polarization are able to provide circular polarization.

As shown in FIG. 2, in an antenna device 1 according to an example, the antenna elements 11, 12 are orthogonal to each other. According to instruction received from the position detecting means 19 and/or state controlling means 15 in co-operation with the processor 17, the signal source is electrically connected to a phase splitter 27 that has two outputs. One of the outputs is electrically connected to the feed point of one of the antenna elements 11, 12, for example the center point 132 of the antenna element 12. The other output of the phase splitter 27 is electrically connected through a delay circuit 23 to the feed point of the other of the antenna elements 11, 12, for example the center point 131 of the antenna element 11. The delay circuit 23 provides a 90 degrees out of phase delay to this other antenna element 11. The antenna device 1 now transmits and receives a circular polarized radio wave so that RFID tags having linear or circular polarized antennas can be read and written. Thus, orientation of the tags is not a critical issue. The antenna device 1 comprises a radio frequency transceiver being arranged to transmit and receive information to/from the antenna elements (11, 12) in co-operation with a processor 17. The transceiver and the processor 17 may be separate chips or integrated into the same chip.

In an antenna device 1 according to another example, the antenna elements 11, 12 are orthogonal to each other and the signal is supplied alternatively to the antenna elements 11, 12 without any phase shift in relation to each other. The phase splitter 27 and/or the delay circuit 23 are thus omitted from the exemplary antenna device 1 shown in FIG. 2. According to instruction received from the position detecting means 19 and/or state controlling means 15 in co-operation with the processor 17, the signal source is electrically connected alternatively to the feed points of the antenna elements 11, 12, for example the center point 132 of the antenna element 12 and the center point 131 of the antenna element 11. In this case, only one of the antenna elements 11, 12 is radiating at a time which means that the signal power is not divided between the antenna elements 11, 12 and thus 3 dB more signal power is obtained. This means that only one of the two polarities is in use at a time. However, when the horizontally and vertically linear polarized electric field components are adapted to be alternately connected to the antenna elements 11, 12 in a suitable way it does not have any slowdown effect for the reading/writing speed. The antenna device 1 comprises a radio frequency transceiver being arranged to transmit and receive information to/from the antenna elements (11, 12) in co-operation with a processor 17. The transceiver and the processor 17 may be separate chips or integrated into the same chip.

In an antenna device 1 according to another example, the antenna elements 11, 12 are orthogonal to each other and the signal is supplied alternatively to the antenna elements 11, 12, the antenna elements 11, 12 are connected to radiate the horizontally and vertically linear polarized radiation independent of each other so that they are connected to radiate one after the other or one at a time.

FIGS. 3a and 3b depict examples of an RFID reader/writer device in which aspects of the disclosed embodiments may be applied. The RFID reader/writer device comprises the antenna device 3 and a frame 36. The antenna device 3 comprises a pair of antenna elements 31, 32 that have all features already disclosed in association with the description of FIG. 1 and FIG. 2 in this application. One of the antenna elements 31, 32 is fixed to a side 361 of the frame 36 so that when being positioned in parallel the antenna elements 31, 32 in their entirety are placed along the side 361 of the frame 36. As shown in FIG. 3a, in this case the antenna element 32 is fixed to the side 361 of the frame 36 so that said antenna element 32 in its entirety is placed along the side 361 of the frame 36. In this case the outer side of the antenna element 32 meets the side 361 of the frame 36 so that the antenna element 32 remains inside the frame 36. Alternatively, the inner side of the antenna element 32 meets the side 361 of the frame 36 so that the antenna element 32 remains outside the frame 36. The one of the antenna elements 31, 32 to be fixed to a side 361 of the frame 36 is fixed either permanently or in a removable way to the frame 36.

In an RFID reader/writer device according to an example, the other of the antenna elements 31, 32 is configured to rotate 90 degrees in relation to the antenna element 32 that is fixed to the side 361 of the frame 36. The antenna elements 31, 32 are movably connected to each other at the connection point by the fastening means as already discussed earlier in this application. One of the antenna elements 31, 32 is rotatable 90 degrees relative to other of the antenna elements 31, 32 around the rotation axis 333 that penetrates the center points of the antenna elements 31, 32. FIG. 3b shows a situation in which the antenna elements 31, 32 are orthogonal in relation to each other. As shown in FIG. 3b, in this case the antenna element 31 is rotatable 90 degrees relative to other antenna element 32 around the rotation axis 333. At the same time, the antenna element 31 is also rotatable 90 degrees relative to side 361 of the frame 36 around the rotation axis 333. The antenna elements 31, 32 have feed points preferably at their center points as earlier discussed in this application and said feed points are electrically isolated from each other but electrically connected to the electronics inside the frame 36 of the RFID reader/writer device.

In handheld portable RFID reader/writer devices the desired reading/writing direction with respect to tags can be achieved when the side 361 where the antenna device 3 is fixed will be on the opposite side of the device where the user of the device stands.

FIG. 4 depicts a block diagram of an RFID reader/writer according to an embodiment. The RFID reader/writer comprises a first antenna element 41 and a second antenna element 42 so that the antenna device 1, 3 is constructed from them. The antenna device 1, 3 comprises all features already discussed earlier in this application. The RFID reader/writer comprises a processor 47 configured to receive position information from the position detecting means 49 so as to control operation of the antenna device 1, 3. Position information is based on the position of the antenna elements 41, 42 with respect to each other. In an example, the position information comprises information about an angle in which the first antenna element 41 is in relation to the second antenna element 42. The processor 47 is also configured to control supply from the signal source (not shown) to the antenna elements 41, 42 according to the position information received from the position detecting means 49. The RFID reader/writer comprises a state controlling means 45 configured to control operation states of the antenna device 1, 3. According to instruction received from the position detecting means 49 and/or the state controlling means 45 in co-operation with the processor 47, the signal source is electrically connected to a phase splitter 48 that has two outputs. The phase splitter 48 is electrically connected to the feed point of one of the first and second antenna element 41, 42. The phase splitter 48 is also electrically connected through a delay circuit 43 to the feed point of the other of the first and second antenna elements 41, 42. In another example, according to instruction received from the position detecting means 49 and/or the state controlling means 45 in co-operation with the processor 47, the signal source is electrically connected alternatively to the feed points of the antenna elements 41, 42. The RFID reader/writer comprises a user interface 46 for input and display information from/to the user. The RFID reader/writer comprises a memory 44 for storing computer program instructions that control the operation states of the RFID reader/writer device when loaded into the processor 47.

In an RFID reader/writer device according to an embodiment, the state controlling means 45 is configured to control the operation states of the antenna device 1, 3, based on at least received position information (at least angle information) from the position detecting means 49. Based on the received position information the state controlling means 45 selects between a first mode where the antenna elements 41, 42 are in parallel to each other and a second mode where the antenna elements 41, 42 are orthogonal to each other. Also any intermediate angle between 0 and 90 degrees is possible between the antenna elements 41, 42.

In an RFID reader/writer device according to an example, in the first mode one of the antenna elements 41, 42 is configured to act as a radiating element. The state controlling means 45 controls the other of the antenna elements 41, 42 to act as a reflecting element so that the reflecting element enhances directivity of radiation of the radiating element.

In an RFID reader/writer device according to another example, in the first mode one of the antenna elements 41, 42 are configured to act as a radiating element. The state controlling means 45 controls the other of the antenna elements 41, 42 is switched to a state in which it does not interfere to operation of the radiating element.

In an RFID reader/writer device according to still another example, in the first mode one of the antenna elements 41, 42 is configured to act as a radiating element. The state controlling means 45 controls the other of the antenna elements 41, 42 to act as a radiating element in combination with the other radiating element. The two antenna elements 41, 42 are connected together to perform a single combined radiating element.

In an RFID reader/writer device according to still another example, in the second mode at least one of the antenna elements 41, 42 is configured to act as a radiating element. The state controlling means 45 controls one of the antenna elements 11, 12 to act as a first radiating element. It radiates a horizontally linear polarized radio wave. The state controlling means 45 controls the other of the antenna elements 11, 12 to act as a second radiating element. It radiates a vertically linear polarized radio wave. The first and second radiating elements are connected to radiate at least partly at the same time. The first and second radiating elements are connected to perform as a combined act a cross polarized radiation. Alternatively, the first and second radiating elements are connected to radiate so that the horizontally and vertically linear polarized radiation are alternating with desired frequency. In other words, when the horizontally linear polarized radiation is switched on, the vertically linear polarized radiation is switched off, and vice versa. Alternatively, the first and second radiating elements are connected to radiate independently so that the horizontally and vertically linear polarized radiation are radiated independent of each other.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope of the invention.

The invention claimed is:

1. An antenna device (1), comprising:
   a pair of antenna elements (11, 12) for an RFID reader/writer to communicate information with an RFID tag, said pair of antenna elements being movably connected to each other so that one of the antenna elements is configured to intensify the other of the antenna elements to radiate radio wave,
   wherein
   in a first mode center axes of length (113, 123) of the antenna elements are in parallel to each other,
   in a second mode the center axes of length of the antenna elements are orthogonal to each other, and
   in the second mode one of the antenna elements is configured to radiate a horizontal linear polarized radio wave and the other of the antenna elements a vertical linear polarized radio wave; and
   position detecting means (19) for detecting a position of the pair of antenna elements with respect to each other and to transmit position information further.

2. An antenna device according to claim 1, wherein at least one of the antenna elements is configured to radiate a linear polarized radio wave.

3. An antenna device according to claim 1, wherein the antenna elements are movably connected to each other at a connection point (131, 132) in which centers of longitudinal and latitude axes of the antenna elements are located.

4. An antenna device according to claim 1, wherein the position detecting means comprises a magnet and a Hall element.

5. An antenna device according to claim 1, wherein the position detecting means comprises at least one of the following: a 3D acceleration sensor and force transducer.

6. An antenna device according to claim 1, wherein one of the antenna elements is configured to rotate 90 degrees relative to the other of the antenna elements.

7. An antenna device according to claim 1, wherein in the first mode one of the antenna elements is configured to act as a radiating element and the other of the antenna elements as a reflecting element so that the reflecting element enhances directivity of radiation of the radiating element.

8. An antenna device according to claim 1, wherein in the first mode one of the antenna elements is configured to act as a radiating element and the other of the antenna elements is switched to a state in which it does not interfere to operation of the radiating element so that the antenna elements are connected to perform the combined act in which the single antenna element is radiating a linear polarized radio wave more effective.

9. An antenna device according to claim 1, wherein in the first mode one of the antenna elements and the other of the antenna elements are switched to act as a combined radiating element.

10. An RFID reader/writer comprising the antenna device (1, 3) of claim 1 and a frame (36), wherein one of the antenna elements (31, 32, 41, 42) is fixed to a side (361) of the frame so that in the first mode the antenna elements in their entirety are placed along the side of the frame.

11. An RFID reader/writer according to claim 10, wherein the other of the antenna elements is configured to rotate 90 degrees in relation to the antenna element that is fixed to the side of the frame.

12. An RFID reader/writer according to claim 10, further comprising a processor (47) configured to receive the position information from the position detecting means (49) so as to control operation of the antenna device according to the position of the pair of antenna elements with respect to each other.

13. An RFID reader/writer according to claim 12, wherein the processor is configured to control power supply to the antenna elements in the first mode and in the second mode according to the position information.

14. An antenna device according to claim 2, wherein the antenna elements are movably connected to each other at a connection point (131, 132) in which centers of longitudinal and latitude axes of the antenna elements are located.

15. An antenna device according to claim 2, wherein one of the antenna elements is configured to rotate 90 degrees relative to the other of the antenna elements.

16. An antenna device according to claim 2, wherein in the first mode one of the antenna elements is configured to act as a radiating element and the other of the antenna elements as a reflecting element so that the reflecting element enhances directivity of radiation of the radiating element.

17. An antenna device according to claim 2, wherein in the first mode one of the antenna elements is configured to act as a radiating element and the other of the antenna elements is switched to a state in which it does not interfere to operation of the radiating element so that the antenna elements are connected to perform the combined act in which the single antenna element is radiating a linear polarized radio wave more effective.

18. An RFID reader/writer according to claim 11, further comprising a processor (47) configured to receive the position information from the position detecting means (49) so as to control operation of the antenna device according to the position of the pair of antenna elements with respect to each other.

\* \* \* \* \*